US 9,906,119 B2

(12) United States Patent
Chen et al.

(10) Patent No.: US 9,906,119 B2
(45) Date of Patent: Feb. 27, 2018

(54) METHOD OF RIPPLE-COMPENSATION CONTROL AND ELECTRICAL ENERGY CONVERSION DEVICE USING THE SAME

(71) Applicant: Industrial Technology Research Institute, Hsinchu (TW)

(72) Inventors: Wan-Pei Chen, Hsinchu County (TW); Yoshihiro Konishi, Hsinchu (TW); Shu-Syuan Huang, Changhua County (TW); Zong-Zhen Yang, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/971,956

(22) Filed: Dec. 16, 2015

(65) Prior Publication Data

US 2017/0093273 A1 Mar. 30, 2017

(30) Foreign Application Priority Data

Sep. 30, 2015 (TW) .............................. 104132375 A

(51) Int. Cl.
*H02M 1/14* (2006.01)
*H02M 7/797* (2006.01)
*H02M 1/15* (2006.01)
*H02M 7/5387* (2007.01)
*H02M 1/00* (2006.01)

(52) U.S. Cl.
CPC ............... *H02M 1/14* (2013.01); *H02M 1/15* (2013.01); *H02M 7/5387* (2013.01); *H02M 7/797* (2013.01); *H02M 2001/007* (2013.01)

(58) Field of Classification Search
CPC ........ H02M 7/5387; H02P 27/04; H02P 27/08
USPC ....................................... 363/37, 40
See application file for complete search history.

(56) References Cited

U.S. PATENT DOCUMENTS 7,170,761 B2 1/2007 Yasumura
8,542,502 B2 9/2013 Kono et al.
(Continued)

FOREIGN PATENT DOCUMENTS

CN 1074865 C 11/2001
CN 103683878 A 3/2014
(Continued)

OTHER PUBLICATIONS

Taiwan Patent Office, Office Action, Patent Application Serial No. 104132375, May 11, 2016, Taiwan.
(Continued)

*Primary Examiner* — Adolf Berhane
*Assistant Examiner* — Bart Iliya

(57) ABSTRACT

A ripple-compensation control method and electrical energy conversion device utilizing the same are provided. The ripple-compensation control method is disclosed, adopted by an electrical energy conversion device including a converter configured to perform electrical energy conversion, a controller coupled to control terminals of the converter and controlling a first voltage of a DC node of the converter according to a command value, and a ripple-compensation unit configured to generate a ripple-component voltage of the first voltage and provide the command value generated based on the ripple-component voltage to the controller.

13 Claims, 9 Drawing Sheets

(56) References Cited

U.S. PATENT DOCUMENTS

| | | | | |
|---|---|---|---|---|
| 2002/0118559 | A1* | 8/2002 | Kurokami | H02M 1/15 363/131 |
| 2009/0167256 | A1* | 7/2009 | Maddali | H02P 9/10 322/25 |
| 2012/0087159 | A1* | 4/2012 | Chapman | H02J 3/383 363/41 |
| 2012/0155126 | A1* | 6/2012 | Yoneda | H02J 3/383 363/40 |
| 2012/0201064 | A1* | 8/2012 | Asakura | H02M 7/53871 363/98 |
| 2013/0033248 | A1 | 2/2013 | Granger | |
| 2013/0082636 | A1 | 4/2013 | Ohori et al. | |
| 2014/0320104 | A1 | 10/2014 | Guo | |
| 2014/0321173 | A1* | 10/2014 | Jones | H02J 3/383 363/40 |
| 2015/0021914 | A1 | 1/2015 | Kim | |
| 2015/0280612 | A1* | 10/2015 | Ide | H02M 7/53871 363/98 |

FOREIGN PATENT DOCUMENTS

| | | |
|---|---|---|
| CN | 103887824 A | 6/2014 |
| CN | 104158392 A | 11/2014 |
| TW | I260953 B | 8/2006 |
| TW | 201315116 | 4/2013 |
| TW | I397244 | 5/2013 |

OTHER PUBLICATIONS

Toshihisa Shimizu et al., "A Unity Power Factor PWM Rectifier with DC Ripple Compensation," IEEE Transactions on Industrial Electronics, Aug. 1997, pp. 447-455, vol. 44, No. 4, IEEE, US.

Mei Su et al., "An Active Power-Decoupling Method for Single-Phase AC-DC Converters," Transactions on Industrial Electronics Informatics, Feb. 2014, pp. 461-468, vol. 10, No. 1, IEEE, US.

Chia-Tse Lee et al., "Efficiency Improvement of a DC/AC Converter with the Power Decoupling Capability," Applied Power Electronics Conference and Exposition, Feb. 2012, pp. 1462-1468, IEEE, US.

Kuo-Hen Chao et al., "New Control Methods for Single Phase PWM Regenerative Rectifier with Power Decoupling Function," IEEE International Conference on Power Electronics and Drive Systems, Nov. 2009, pp. 1091-1096, IEEE, US.

Tsuno, K. et al., "Optimization of the DC Ripple Energy Compensating Circuit on a Single-Phase Voltage Source PWM Rectifier," IEEE Power Electronics Specialists Conference, Jun. 2004, pp. 316-321, vol. 1, IEEE, US.

Kuo-Hen Chao et al., "Power Decoupling Methods for Single-Phase Three-Poles AC/DC Converters," Energy Conversion Congress and Exposition, Sep. 2009, pp. 3742-3747, IEEE, US.

A.K. Verma et al., "Vehicle to Grid and Grid to Vehicle Bidirectional Power Flow at Unity Power Factor with DC Ripple Compensation," Industrial and Information Systems, Aug. 2012, pp. 1-6, IEEE, US.

* cited by examiner

US 9,906,119 B2

METHOD OF RIPPLE-COMPENSATION CONTROL AND ELECTRICAL ENERGY CONVERSION DEVICE USING THE SAME

CROSS REFERENCE TO RELATED APPLICATION

The present application is based on, and claims priority from, Taiwan Application Serial Number 104132375, filed 30 Sep. 2015, the disclosure of which is hereby incorporated by reference herein in its entirety.

TECHNICAL FIELD

The technical field relates to the method of ripple-compensation control and electrical energy conversion device using the same.

BACKGROUND

The converter circuit converts an AC power source to a DC power source, or a DC power source to an AC power source. The common application is to use a controller to control the DC side voltage of the converter, and normally reduce the gain of the controller when controlling the DC side voltage of the converter to approach a DC constant.

SUMMARY

An embodiment of a ripple-compensation control method is disclosed. The method is adopted by a converter controlled by a controller which controls a first voltage of a DC node of the converter according to a command value, comprising: obtaining a ripple-component voltage of the first voltage corresponding to an AC node of the converter; and generating the command value based on the ripple-component voltage and controlling the converter according to the command value.

An embodiment of an electrical energy conversion device applying ripple-compensation control is disclosed. The electrical energy conversion device comprises a converter configured to perform electrical energy conversion, a controller coupled to control terminals of the converter and controlling a first voltage of a DC node of the converter according to a command value, and a ripple-compensation unit configured to generate a ripple-component voltage of the first voltage and provide the command value generated based on the ripple-component voltage to the controller.

A detailed description is given in the following embodiments with reference to the accompanying drawings.

BRIEF DESCRIPTION OF DRAWINGS

The present invention can be more fully understood by reading the subsequent detailed description and examples with references made to the accompanying drawings, wherein.

DETAILED DESCRIPTION

Figure 1:
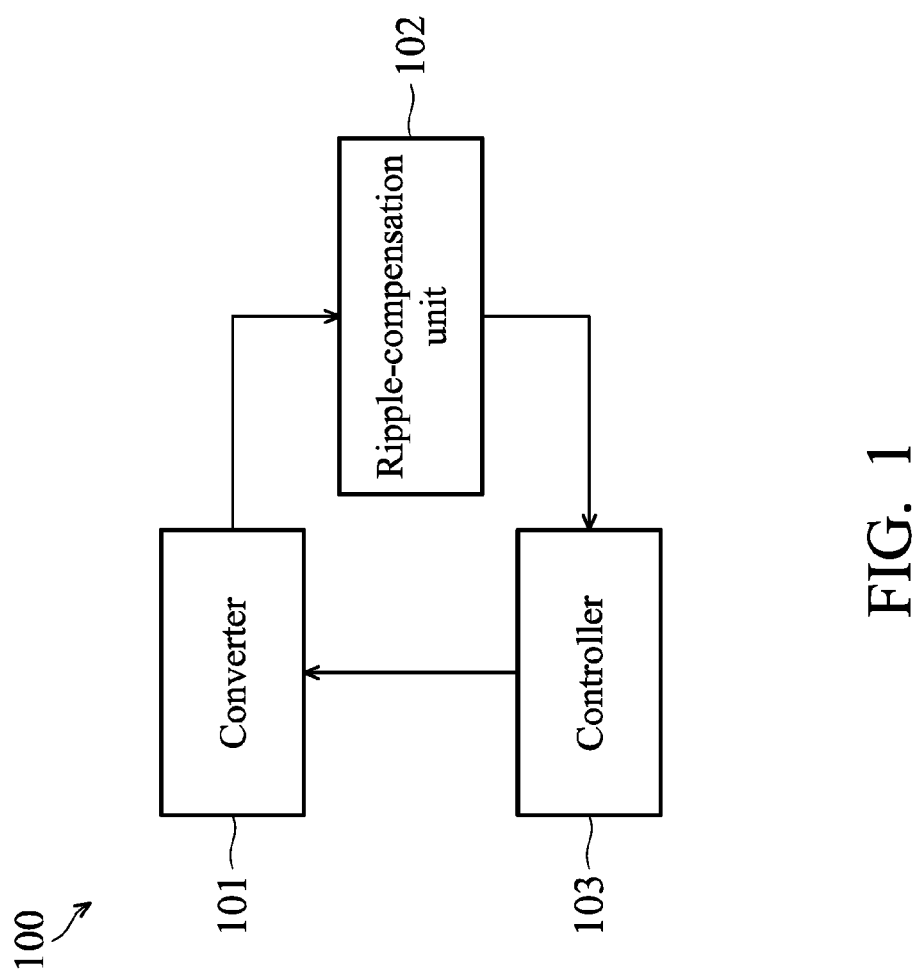
FIG. 1 shows a block diagram of an electrical energy conversion device according to an exemplary embodiment.

In the following detailed description, for the purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 illustrates a block diagram of the electrical energy conversion device 100 according to an exemplary embodiment. The electrical energy conversion device 100 comprises the converter 101, ripple-compensation unit 102 and controller 103. The converter 101 is configured to perform the conversion as DC-to-AC or AC-to-DC, and the controller 103 controls the performance of the conversion.

According to one embodiment of the present disclosure, the ripple-compensation unit 102 combines a ripple-component power, which is generated at the AC side of the converter 101, and a predetermined command value (e.g. a predetermined command voltage) to generate a command value (e.g. a command voltage), and then provides the command value to the controller 103. The controller 103 controls the DC side voltage of the converter 101 according to the command value, and makes the DC side voltage of the converter 101 contain the voltage component corresponding to the ripple-component power in order to improve the power balance between the DC side and AC side of the converter 101.

Figure 2:
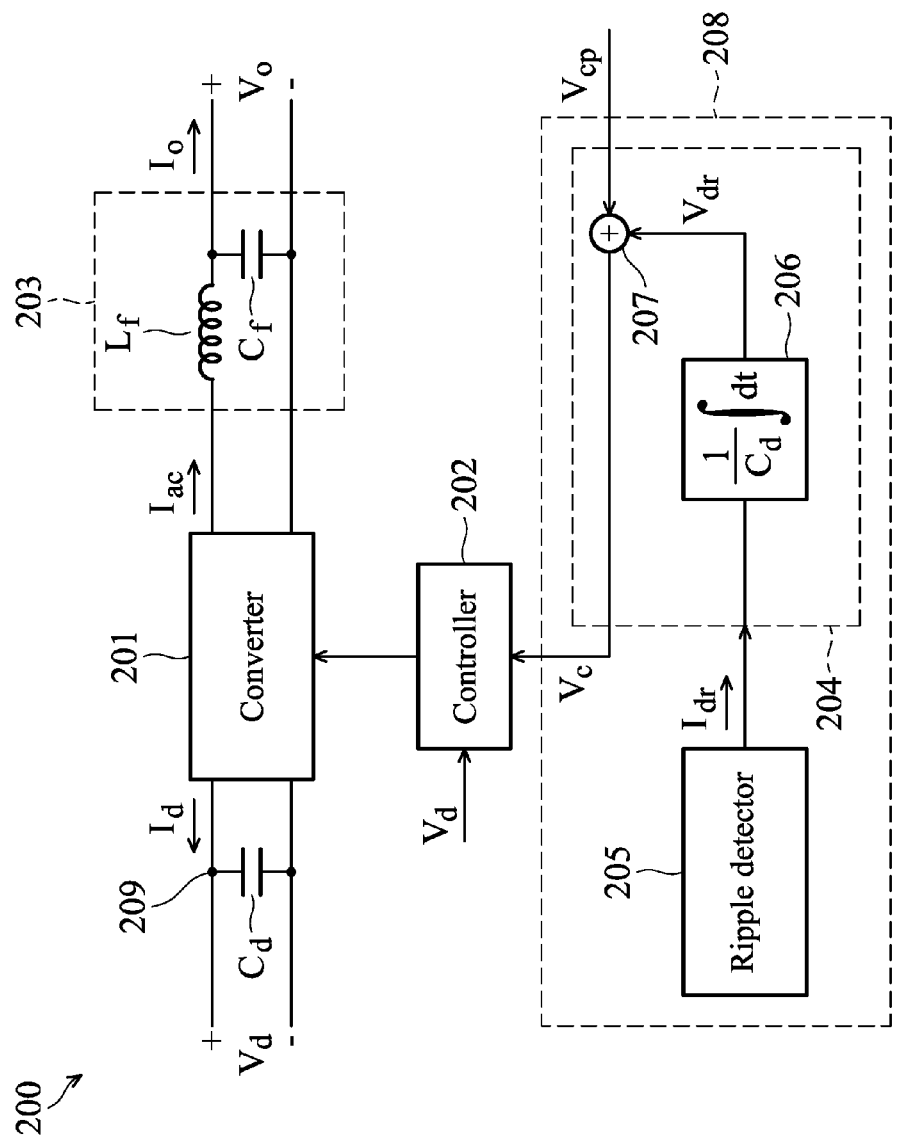
FIG. 2 shows an electrical energy conversion device according to an exemplary embodiment.

FIG. 2 illustrates the electrical energy conversion device 200 according to one embodiment of the present disclosure. The electrical energy conversion device 200 comprises the converter 201, controller 202, first filter 203 and ripple-compensation unit 208. The ripple-compensation unit 208 comprises a first computation device 204 and a ripple detector 205. In this embodiment, the converter 201 is a single phase AC/DC inverter. The controller 202 is coupled to the control terminal and DC node 209, placed at the DC side, of the converter 201, controlling the voltage (which is noted as the first voltage $V_d$) of the DC node 209 according to the command voltage $V_c$, and the command voltage $V_c$ is provided by the ripple-compensation unit 208. The ripple-compensation unit 208 generates the ripple-component current $I_{dr}$ corresponding to the ripple-component power of the power at the AC side of the converter 201 through the ripple detector 205. The ripple-component current $I_{dr}$ is transformed into ripple-component voltage $V_{dr}$ by an integrator 206 of the first computation device 204, and the ripple-component voltage $V_{dr}$ is combined with the predetermined command voltage $V_{cp}$ to generate the command voltage $V_c$ through the adder 207 of the first computation device 204. The controller 202 controls the first voltage $V_d$ based on the command voltage $V_c$ which relates to the ripple-component power. Based on the operation of the controller 202, the first voltage $V_d$ will approach the command voltage $V_c$, and when the controller 202 provides higher gain performance, the first voltage $V_d$ will approach the command voltage $V_c$ more quickly.

Based on the embodiment described above, the first voltage $V_d$ will reflect the change of the ripple-component power, and therefore the converter 201 can have balanced power between the DC side and AC side thereof. It will be seen from this that the described embodiment can make the converter 201 have balanced power between the DC side and the AC side without degrading the gain performance of the controller 202. In other words, the described embodiment can maintain the proper gain performance of the controller 202 and reduce the current harmonic distortion at the AC side of the converter 201 at the same time.

Figure 3A:
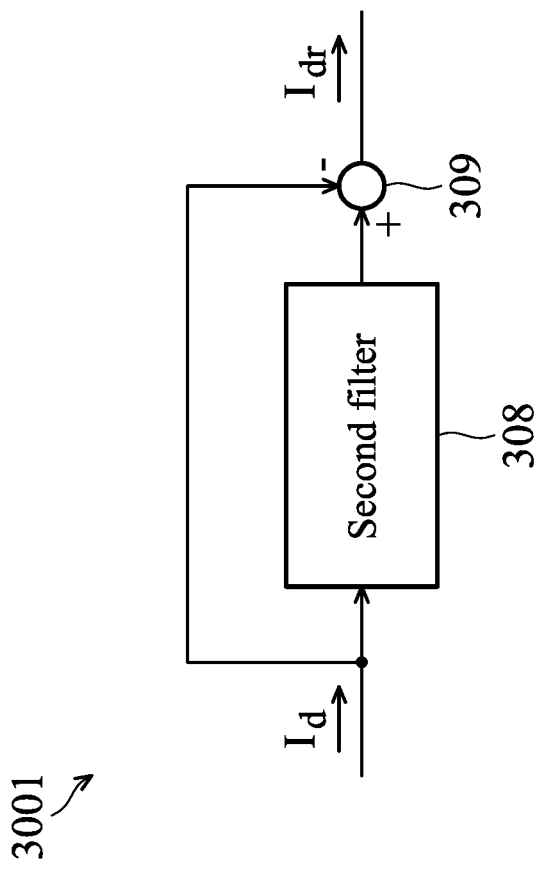
FIGS. 3A-3C show examples of ripple detector according to some exemplary embodiments.
Figure 3B:
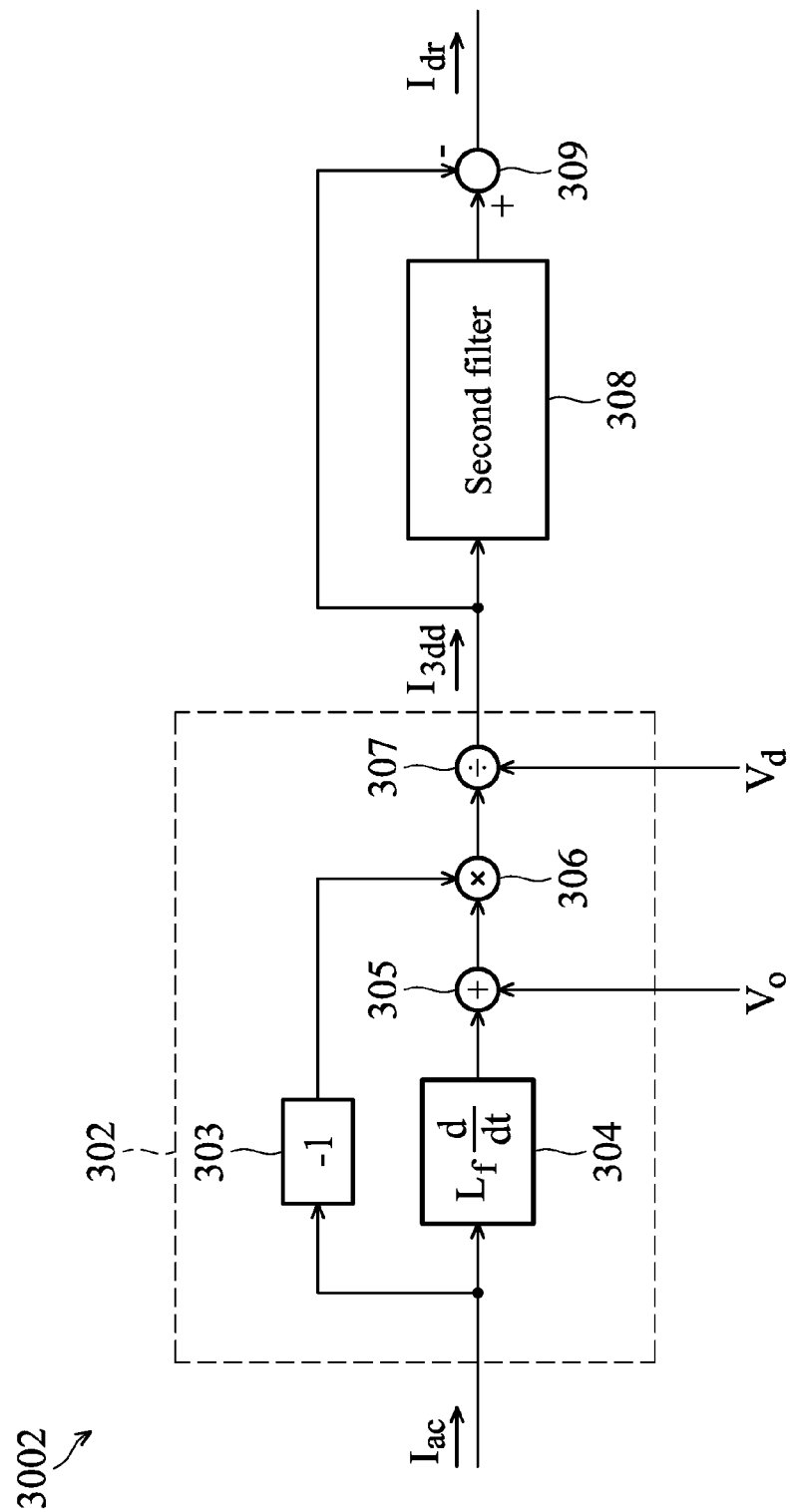
Figure 3C:
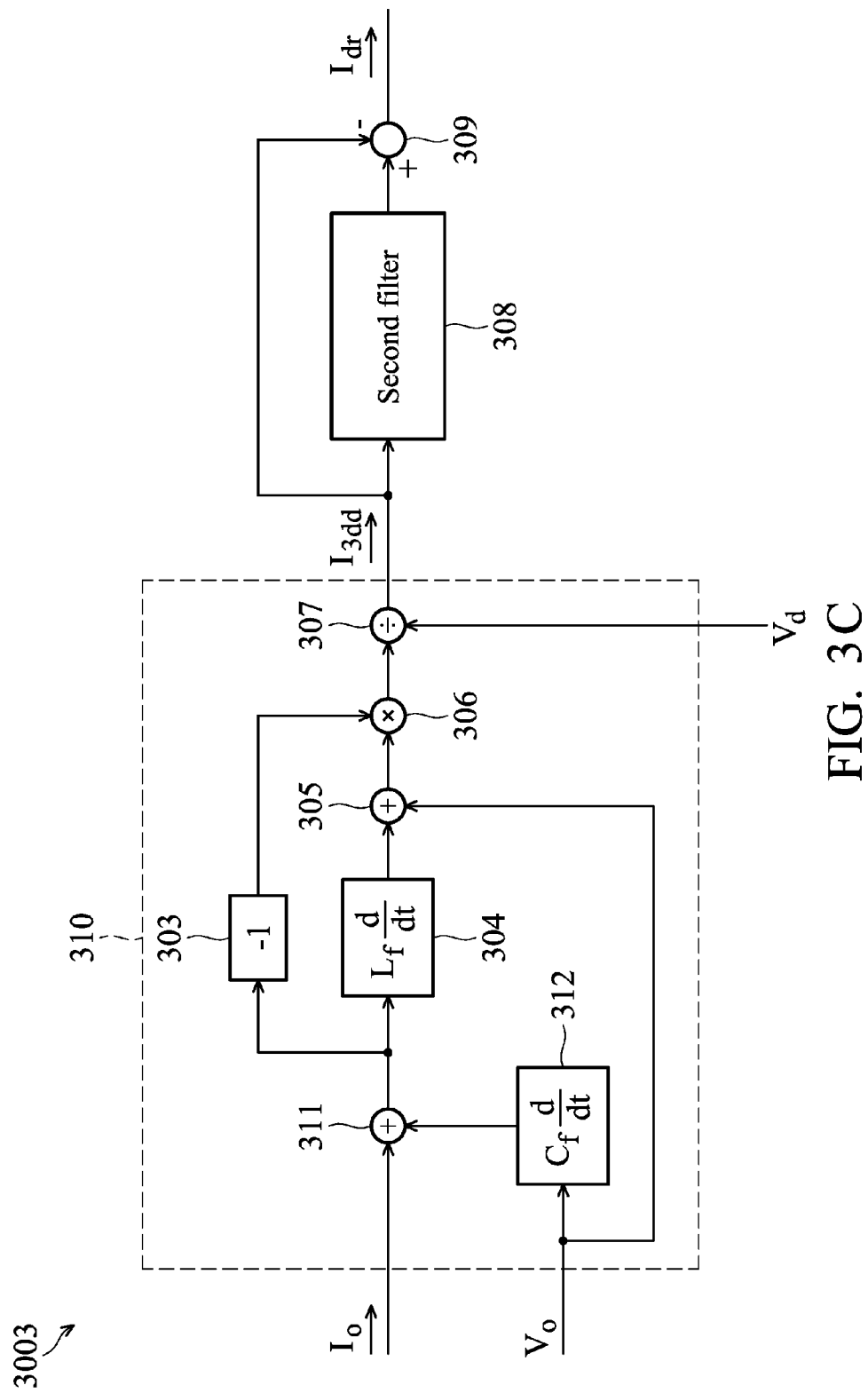

In this embodiment, the first filter 203 is a low pass filter consisting of the inductor $L_f$ and capacitor $C_f$, but the present disclosure is not limited by this description. In this embodiment, the first computation device 204 consists of the integrator 206 and adder 207, but the present disclosure is not limited by this description. In some embodiments, the converter 201 may be any type of electrical energy converter performing DC-to-AC or AC-to-DC conversion. In some embodiments, the ripple detector 205 may detect the ripple-component current $I_{dr}$ through various methods, such as those that are depicted in FIGS. 3A-3C, but the present disclosure is not limited by this description. In some embodiments, the AC current $I_o$ will be sent to the controller 202.

FIG. 3A illustrates the ripple detector 3001 according to an exemplary embodiment. The ripple detector 3001 comprises a second filter 308 and a subtractor 309. The ripple detector 3001 obtains the DC current $I_d$ at the DC side of the converter 201 through a sampling circuit (which is not shown in FIG. 3A). The DC current $I_d$ is converted to ripple-component current $I_{dr}$ by the operation of the second filter 308 and the subtractor 309.

FIG. 3B illustrates the ripple detector 3002 according to another exemplary embodiment. Ripple detector 3002 comprises the second computation device 302, second filter 308 and subtractor 309. The second computation device 302 comprises the inverter 303, differentiator 304, adder 305, multiplier 306, and divider 307. The ripple detector 3002 obtains the output current at the AC side of the converter 201 (AC current $I_{ac}$), the output voltage of the first filter 203 (AC voltage $V_o$) and the first voltage $V_d$ through a first, second, and third sampling circuit (which are not shown in FIG. 3B), respectively. The second computation device 302 receives and computes the AC current $I_{ac}$, AC voltage $V_o$ and the first voltage $V_d$ to generates the equivalent DC current $I_{3dd}$. The equation (1) that generates the equivalent DC current $I_{3dd}$ is expressed below.

$$I_{3dd} = -\frac{\left(V_o + L_f \frac{dI_{ac}}{dt}\right) I_{ac}}{V_d} \quad (1)$$

The equation (1) transforms the AC current $I_{ac}$ into an output power at the AC side of the converter 201 after the operation of the multiplier 306 in FIG. 3B, and divides the output power by the first voltage $V_d$ to generate the equivalent DC current $I_{3dd}$. The equivalent DC current $I_{3dd}$ is converted to ripple-component current $I_{dr}$ through the operation of the second filter 308 and subtractor 309. In this embodiment, the second filter 308 may be a low pass filter or a moving average filter, but the present disclosure is not limited by this description.

FIG. 3C illustrates the ripple detector 3003 according to an alternative embodiment. The ripple detector 3003 comprises the second computation device 310, second filter 308, and subtractor 309. The second computation device 310 comprises the inverter 303, differentiator 304, differentiator 312, adder 305, adder 311, multiplier 306, and divider 307. The ripple detector 3003 obtains the output current of the first filter 203 (AC current $I_o$), the output voltage of the first filter 203 (AC voltage $V_o$) and the first voltage $V_d$ through a fourth, fifth, and sixth sampling circuit (which are not shown in FIG. 3C) respectively. The second computation device 310 receives and computes the AC current $I_o$, AC voltage $V_o$ and the first voltage $V_d$ to generates an equivalent DC current $I_{3dd}$. The equation (2) that generates the equivalent DC current $I_{3dd}$ is expressed below.

$$I_{3dd} = -\frac{\left(V_o + L_f \frac{dI_{ac}}{dt}\right)\left(I_o + C_f \frac{dV_o}{dt}\right)}{V_d} \quad (2)$$

The equation (2) transforms the AC current $I_o$ and AC voltage $V_o$ into the AC current $I_{ac}$ after the operation of the adder 311 in FIG. 3C, and then performs the computation as equation (1) to generate the ripple-component current $I_{dr}$. In this embodiment, the second filter 308 may be a low pass filter or a moving average filter, but the present disclosure is not limited by this description.

Figure 4A:
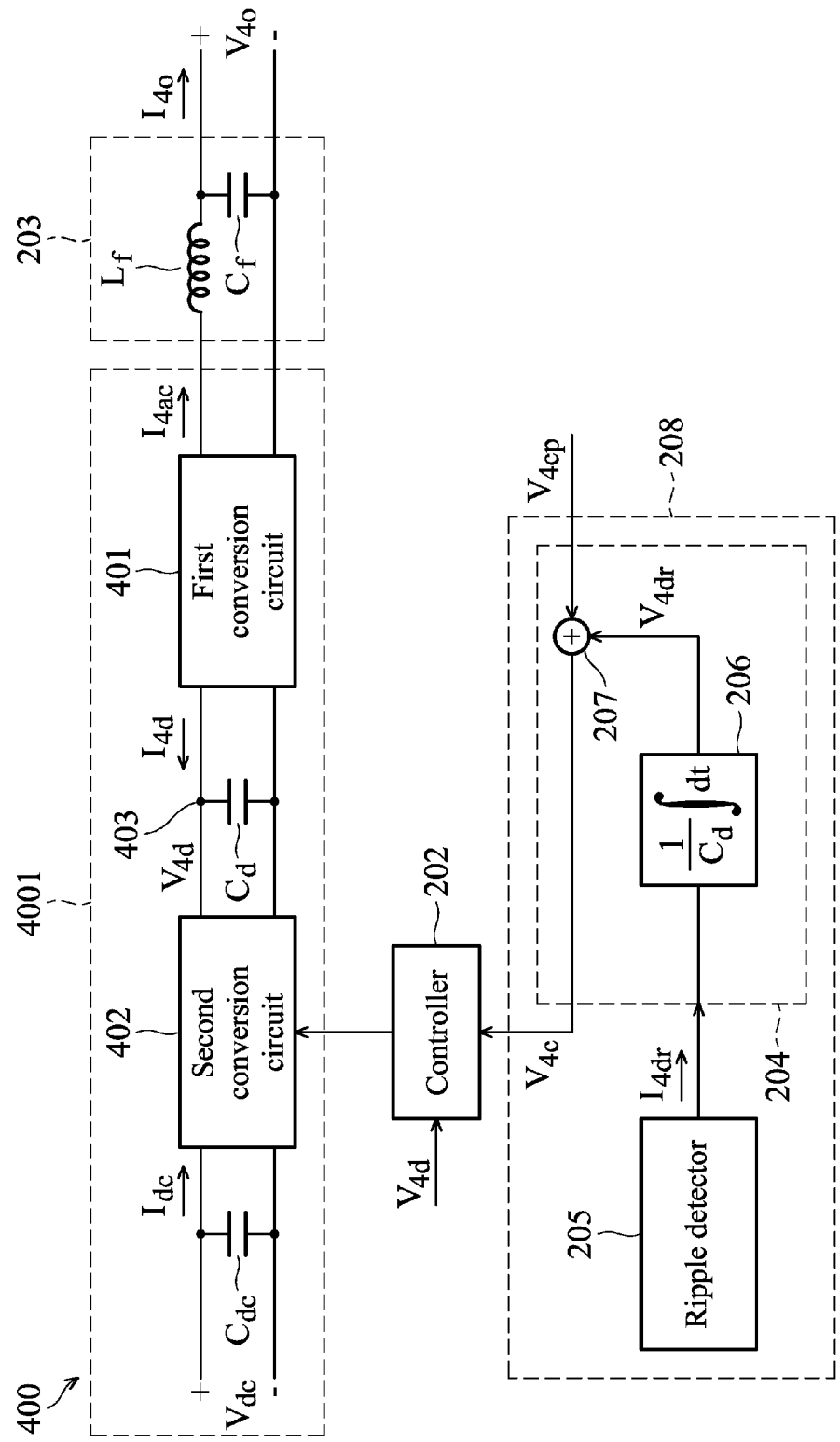
FIG. 4A shows an electrical energy conversion device according to an exemplary embodiment.

FIG. 4A illustrates the electrical energy conversion device 400 according to an exemplary embodiment. The electrical energy conversion device 400 comprises the converter 4001, controller 202, first filter 203 and ripple-compensation unit 208. The converter 4001 comprises the first conversion circuit 401, second conversion circuit 402 and capacitors $C_d$ and $C_{dc}$.

In this embodiment, the first conversion circuit 401 is a single phase AC/DC inverter. The DC node 403 at the DC side of the first conversion circuit 401 is coupled to the second conversion circuit 402 and controller 202, and the second conversion circuit 402 is a DC/DC converter. The controller 202 controls the voltage of the DC node 403 (which is noted as the first voltage $V_{4d}$) according to the command voltage $V_{4c}$, and the command voltage $V_{4c}$ is provided by the ripple-compensation unit 208. The ripple-compensation unit 208 generates a ripple-component current $I_{4dr}$ corresponding to the ripple-component power of the power at the AC side of the first conversion circuit 401. The ripple-component current $I_{4dr}$ is transformed into a ripple-component voltage $V_{4dr}$ by the integrator 206 of the first computation device 204, and the adder 207 of the first computation device 204 combines the ripple-component voltage $V_{4dr}$ and a predetermined command voltage $V_{4cp}$ to generate the command voltage $V_{4c}$. The controller 202 controls the first voltage $V_{4d}$ according to the command voltage $V_{4c}$ which relates to the ripple-component power, generates a pulse width modulation (PWM) signal, and sends the PWM signal to the control terminal of the second conversion circuit 402 in order to control the output thereof. Based on the operation of the controller 202, the first voltage $V_{4d}$ will approach the command voltage $V_{4c}$, and when the controller 202 provides higher gain performance, the first voltage $V_{4d}$ will approach the command voltage $V_{4c}$ more quickly.

Based on the embodiment described above, the first voltage $V_{4d}$ contains the components related to the ripple-component power, and therefore the first conversion circuit 401 can have balanced power between the DC side and AC side thereof to make the electrical energy conversion device 400 achieve a power balance. It will be seen from this that the controller 202 of the electrical energy conversion device 400 can maintain proper gain performance, and because the DC side of the first conversion circuit 401 also contains the components related to the ripple-component power, the AC side of the first conversion circuit 401 can maintain the original AC waveform, and therefore the distortion status of the AC current at the AC side of the first conversion circuit 401 can be reduced. Additionally, based on the DC side and AC side of the first conversion circuit 401 being able to achieve a power balance, the amount of ripple current caused by the ripple-component power will flow to a capacitor $C_d$ after the first voltage $V_{4d}$ containing the components related to the ripple-component power, so the amount of ripple components, which are caused by the ripple-component power, of the DC current $I_{dc}$ can also be reduced. Meanwhile, the capacitor $C_d$ does not need to be enlarged to make the first voltage $V_{4d}$ approach a DC constant.

Figure 4B:
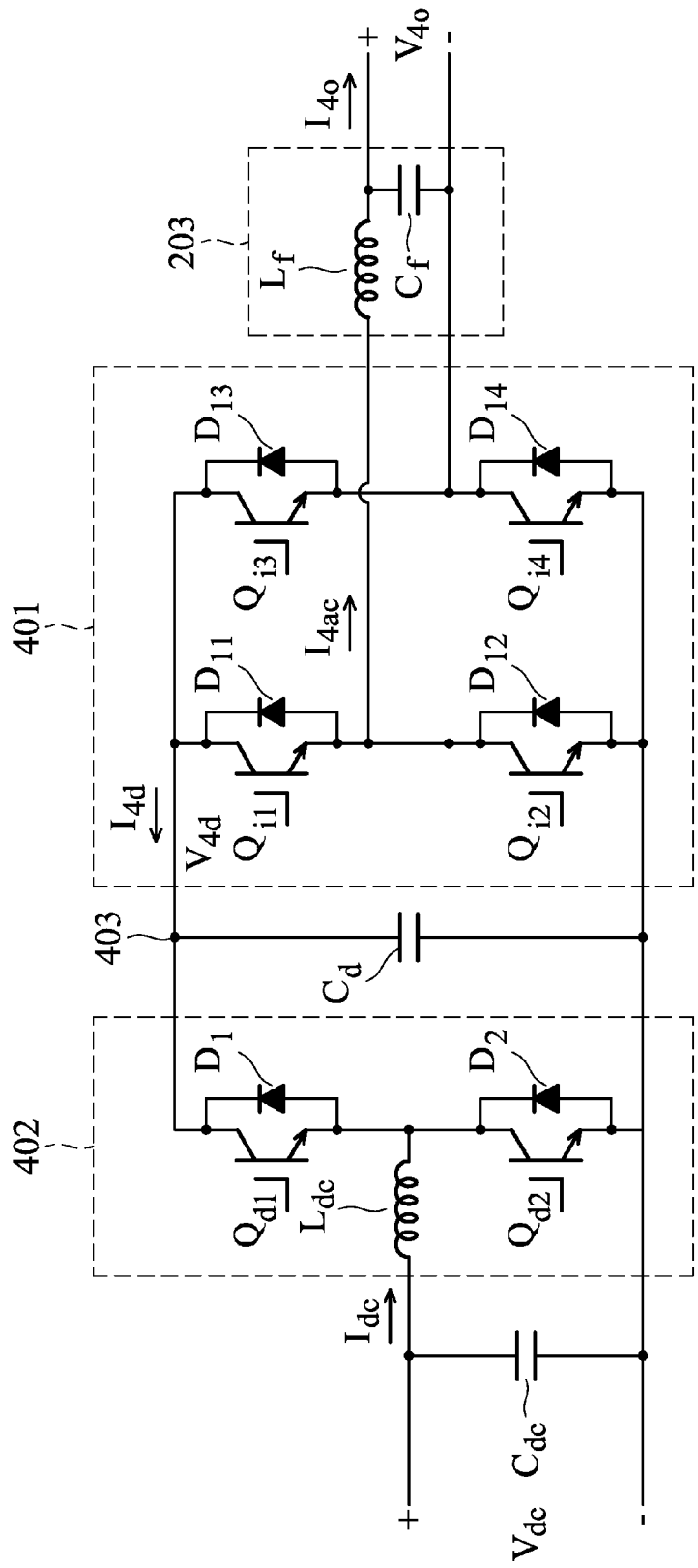
FIG. 4B shows a circuit which combines single phase AC/DC inverter and boost-type DC/DC converter according to an exemplary embodiment.

In some embodiments, the first conversion circuit 401 may be any type of electrical energy converter performing DC-to-AC or AC-to-DC conversion, and the second conversion circuit 402 may be any type of DC/DC converter comprising boost type, buck type, or resonant circuits. In some embodiments, the DC current $I_{dc}$ will be sent to the controller 202. As FIG. 4B shows, the first conversion circuit 401 may be a single phase AC/DC inverter consisting of power switch components $Q_{i1\sim i4}$ and diodes $D_{11\sim 14}$, and the power switch components $Q_{i1\sim i4}$ are coupled to a driving control circuit (which is not shown in FIG. 4A), such as a PWM driving control circuit. On the other hand, the second conversion circuit 402 may be a boost type DC/DC converter consisting of power switch components $Q_{d1\sim d2}$ and diodes $D_{1\sim 2}$, and the power switch components $Q_{d1\sim d2}$ are coupled to the controller 202 and receive PWM signals therefrom.

Figure 5A:
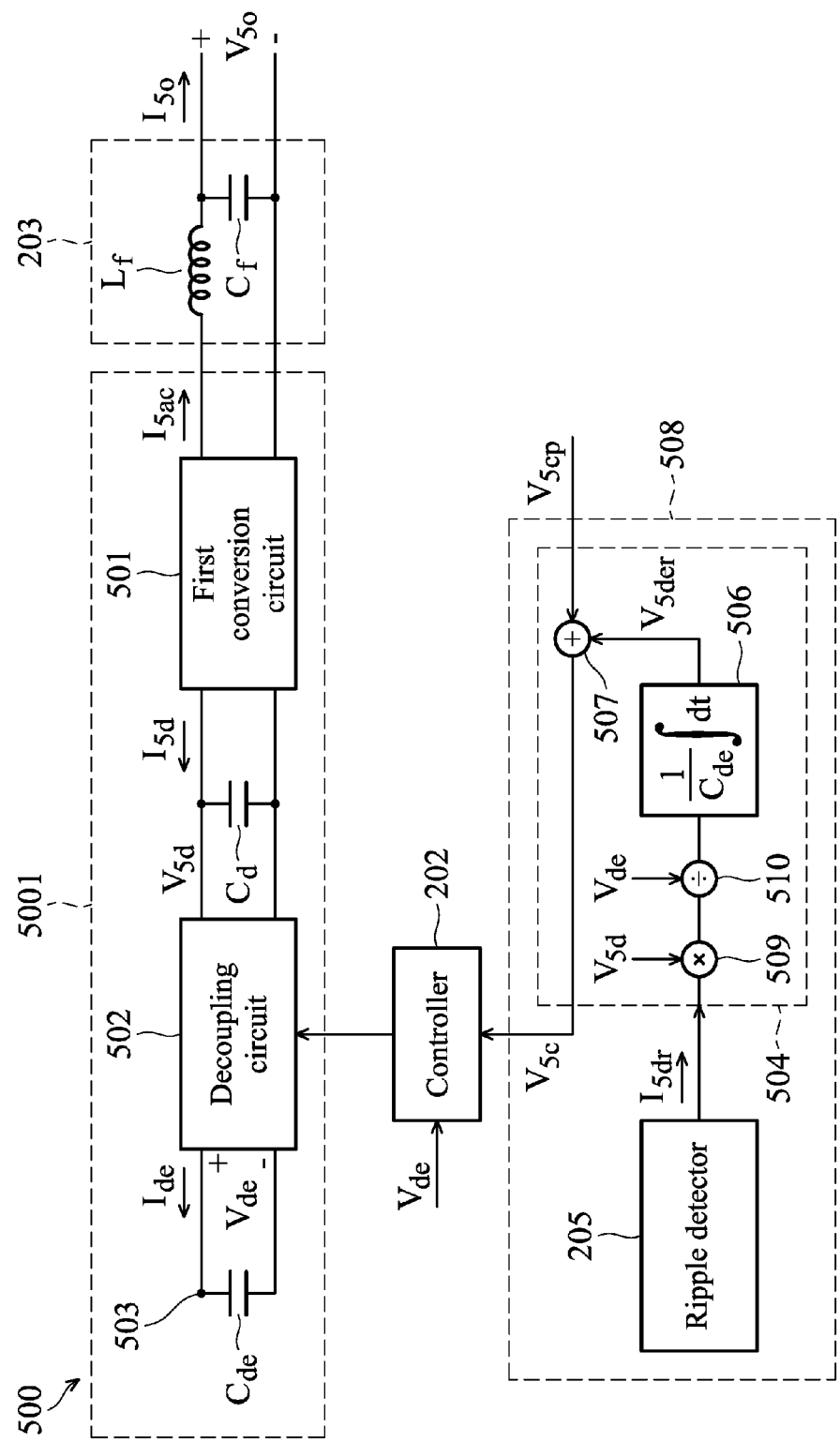
FIG. 5A shows an electrical energy conversion device according to an exemplary embodiment.

FIG. 5A illustrates the electrical energy conversion device 500 according to an exemplary embodiment. The electrical energy conversion device 500 comprises the converter 5001, controller 202, first filter 203, and ripple-compensation unit 508. The converter 5001 comprises the first conversion circuit 501, decoupling circuit 502, and capacitors $C_d$ and $C_{de}$.

In this embodiment, the first conversion circuit 501 is a single phase AC/DC inverter. The DC side of the first conversion circuit 501 is coupled to the second terminal of the decoupling circuit 502, and the first terminal (DC node 503) of the decoupling circuit 502 is coupled to the controller 202. The controller 202 controls the voltage of the DC node 503 (which is noted as the first voltage $V_{de}$) according to the command voltage $V_{5c}$, and the command voltage $V_{5c}$ is provided by the ripple-compensation unit 508. The ripple-compensation unit 508 generates a ripple-component current $I_{5dr}$ corresponding to the ripple-component power of the power at the AC side of the first conversion circuit 501, and obtains the first voltage $V_{de}$ and DC voltage $V_{5d}$ through a seventh and eighth sampling circuit (which are not shown in FIG. 5A), respectively. The ripple-component current $I_{5dr}$ is multiplied by the DC voltage $V_{5d}$ through the multiplier 509 to generate the ripple-component power of the power at the DC side of the first conversion circuit 501, and then the ripple-component power is divided by the first voltage $V_{de}$ through the divider 510; the resulting outcome is sent to the integrator 506 of the first computation device 504 to generate the ripple-component voltage $V_{5der}$, and the ripple-component voltage $V_{5der}$ is combined with the predetermined command voltage $V_{5cp}$ by the adder 507 of the first computation device 504 to generate the command voltage $V_{5c}$. The controller 202 controls the first voltage $V_{de}$ according to the command voltage $V_{5c}$ which relates to the ripple-component power, generates a PWM signal, and sends the PWM signal to the control terminal of the decoupling circuit 502 in order to control the output thereof. Based on the operation of the controller 202, the first voltage $V_{de}$ will approach the command voltage $V_{5c}$, and when the controller 202 provides higher gain performance, the first voltage $V_{de}$ will approach the command voltage $V_{5c}$ more quickly. Based on the embodiment described above, the first voltage $V_{de}$ contains the components related to the ripple-component power, and therefore makes the electrical energy conversion device 500 have balanced power between the DC side and AC side thereof. In that case, the ripple-component power will be transferred to the side including $V_{de}$ of the decoupling circuit 502, and the voltage and current at the DC side of the first conversion circuit 501 will contain a small amount of ripple voltage and current, respectively. Meanwhile, the size of the capacitor $C_{de}$ of the decoupling circuit 502 can be reduced.

Figure 5B:
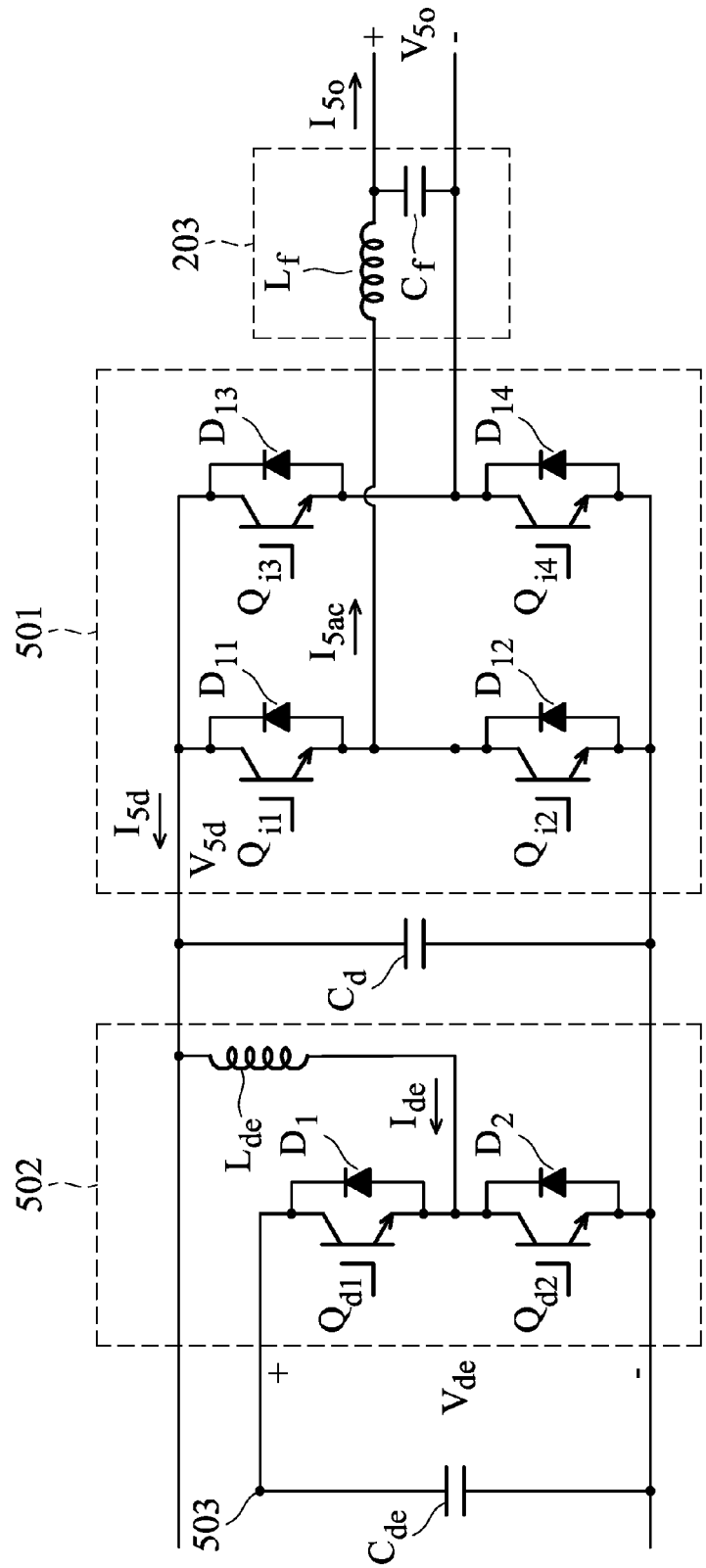
FIG. 5B shows a circuit which combines single phase AC/DC inverter and boost-type power decoupling unit according to an exemplary embodiment.

In some embodiments, the first conversion circuit 501 may be any type of electrical energy converter performing DC-to-AC or AC-to-DC conversion, and the decoupling circuit 502 may be any type of bidirectional DC/DC converter comprising the boost type, buck type, or isolated type. In some embodiments, the DC current $I_{de}$ will be sent to the controller 202. As FIG. 5B shows, the first conversion circuit 501 may be a single phase AC/DC inverter consisting of power switch components $Q_{i1\sim i4}$ and diodes $D_{11\sim 14}$, and the power switch components $Q_{i1\sim i4}$ are coupled to a driving control circuit (which is not shown in FIG. 5A), such as a PWM driving control circuit. On the other hand, the decoupling circuit 502 may be a boost type power decoupling circuit consisting of power switch components $Q_{d1\sim d2}$ and diodes $D_{1\sim 2}$, and the power switch components $Q_{d1\sim d2}$ are coupled to the controller 202 and receive PWM signals therefrom.

The ripple-compensation control method provided by the various described embodiments can be applied to a power factor corrector (PFC), an AC/DC unidirectional power inverter, or a combination of a DC/AC unidirectional power inverter, bidirectional AC/DC inverter, and DC/DC power converter, and also can be adopted to a grid-connected type or stand-alone type system.

It will be apparent to those skilled in the art that various modifications and variations can be made to the disclosed embodiments. It is intended that the specification and examples be considered as exemplary only, with the true scope of the disclosure being indicated by the following claims and their equivalents.

What is claimed is:

1. A ripple-compensation control method, adopted by a converter controlled by a controller which controls a first voltage of a DC node of the converter according to a command value, comprising:
    obtaining a power level of an AC node of the converter;
    obtaining the first voltage;
    obtaining a current of the DC node based on the power level and the first voltage;
    generating an equivalent DC current according to the current of the DC node or an output current of the AC node;

filtering the equivalent DC current to generate a filtered current;
utilizing a subtractor to process the filtered current and the equivalent DC current to generate a ripple-component current;
obtaining a ripple-component voltage based on the ripple-component current; and
generating the command value based on the ripple-component voltage and controlling the converter according to the command value;
wherein the ripple-component voltage is an AC voltage.

2. An electrical energy conversion device applying ripple-compensation control, comprising:
a converter, configured to perform electrical energy conversion;
a controller, coupled to control terminals of the converter and controlling a first voltage of a DC node of the converter according to a command value; and
a ripple-compensation unit, configured to generate a ripple-component voltage of the first voltage corresponding to an AC node of the converter and provide the command value generated based on the ripple-component voltage to the controller;
wherein the ripple-component voltage is an AC voltage,
wherein the ripple-compensation unit comprises:
a ripple detector, configured to generate a ripple-component current of a first current, wherein the ripple detector generates an equivalent DC current according to a DC current at the DC node of the converter or an output current of the AC node of the converter; and
a first computation device, configured to generate the command value through a computation of the ripple-component current and a predetermined command value, wherein the ripple detector comprises:
a first filter processing the equivalent DC current to generate a filtered current; and
a subtractor processing the filtered current and the equivalent DC current to generate the ripple-component current.

3. The electrical energy conversion device of claim 2, further comprising:
a second filter, coupled to the AC node of the converter.

4. The electrical energy conversion device as claimed in claim 3, wherein the ripple detector comprises:
a first sampling circuit, coupled to the AC node to obtain the output current of the AC node;
a second sampling circuit, coupled to the second filter to obtain an output voltage of the second filter;
a third sampling circuit, coupled to the DC node to obtain the first voltage; and
a second computation device, configured to generate the first current through a computation of the output current, the output voltage and the first voltage.

5. The electrical energy conversion device as claimed in claim 4, wherein the converter performs the conversion as DC-to-AC or AC-to-DC;
wherein the DC node is placed at a DC side of the converter.

6. The electrical energy conversion device as claimed in claim 4, wherein the converter comprises:
a first conversion circuit, performing the conversion as DC-to-AC or AC-to-DC, and the DC node is placed at a DC side of the converter; and
a second conversion circuit, coupled to the DC node and including the control terminals to perform DC-to-DC conversion according to the command value.

7. The electrical energy conversion device as claimed in claim 3, wherein the ripple detector comprises:
a first sampling circuit, coupled to the second filter to obtain an output current of the second filter;
a second sampling circuit, coupled to the second filter to obtain an output voltage of the second filter; and
a third sampling circuit, coupled to the DC node to obtain the first voltage;
a second computation device, configured to generate the first current through a computation of the output current, the output voltage and the first voltage.

8. The electrical energy conversion device as claimed in claim 7, wherein the converter performs the conversion as DC-to-AC or AC-to-DC;
wherein the DC node is placed at a DC side of the converter.

9. The electrical energy conversion device as claimed in claim 7, wherein the converter comprises:
a first conversion circuit, performing the conversion as DC-to-AC or AC-to-DC, and the DC node is placed at a DC side of the converter; and
a second conversion circuit, coupled to the DC node and including the control terminals to perform DC-to-DC conversion according to the command value.

10. The electrical energy conversion device as claimed in claim 3, wherein the converter comprises:
a first conversion circuit, performing the conversion as DC-to-AC or AC-to-DC; and
a decoupling circuit, including a first terminal as the DC node, a second terminal electrically connected to a DC side of the first conversion circuit and the control terminals to perform decoupling according to the first voltage controlled by the command value.

11. The electrical energy conversion device as claimed in claim 10, wherein the ripple-compensation unit comprises:
a first sampling circuit, coupled to the DC node to obtain the first voltage; and
a second sampling circuit, coupled to the second terminal to obtain a second voltage;
wherein the first computation device is configured to generate the command value through the computation of the ripple-component current, the predetermined command value, the second voltage and the first voltage.

12. The electrical energy conversion device as claimed in claim 11, wherein the ripple detector comprises:
a third sampling circuit, coupled to the AC node to obtain an output current of the AC node;
a fourth sampling circuit, coupled to the second filter to obtain an output voltage of the second filter; and
a second computation device, configured to generate the first current through a computation of the output current, the output voltage and the second voltage.

13. The electrical energy conversion device as claimed in claim 11, wherein the ripple detector comprises:
a third sampling circuit, coupled to the second filter to obtain an output current of the second filter;
a fourth sampling circuit, coupled to the second filter to obtain an output voltage of the second filter; and
a second computation device, configured to generate the first current through a computation of the output current, the output voltage and the second voltage.

* * * * *